United States Patent
Perez

(10) Patent No.: US 12,282,891 B2
(45) Date of Patent: *Apr. 22, 2025

(54) ASSET RETURN TECHNOLOGY

(71) Applicant: United Parcel Service of America, Inc., Atlanta, GA (US)

(72) Inventor: Juan Perez, Milton, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/679,147

(22) Filed: May 30, 2024

(65) Prior Publication Data
US 2024/0320610 A1  Sep. 26, 2024

Related U.S. Application Data

(63) Continuation of application No. 17/235,127, filed on Apr. 20, 2021, now Pat. No. 12,045,771.
(Continued)

(51) Int. Cl.
| | | |
|---|---|---|
| *G06Q 10/0837* | (2023.01) | |
| *G06F 16/29* | (2019.01) | |
| *G06K 7/14* | (2006.01) | |
| *G06K 19/06* | (2006.01) | |
| *G06Q 10/083* | (2024.01) | |

(52) U.S. Cl.
CPC ......... *G06Q 10/0837* (2013.01); *G06F 16/29* (2019.01); *G06Q 10/0838* (2013.01); *G06K 7/1417* (2013.01); *G06K 19/06037* (2013.01)

(58) Field of Classification Search
CPC ............ G06Q 10/0837; G06Q 10/0838; G06F 16/29; G06K 7/1417; G06K 19/06037
See application file for complete search history.

(56) References Cited

U.S. PATENT DOCUMENTS

| | | | |
|---|---|---|---|
| 9,292,824 B1 * | 3/2016 | Freeman | G06K 19/06037 |
| 10,383,250 B1 * | 8/2019 | Paterra | H05K 7/1497 |

(Continued)

FOREIGN PATENT DOCUMENTS

| | | | | |
|---|---|---|---|---|
| CN | 110858821 A | * | 3/2020 | G06F 9/45558 |
| WO | WO-0188823 A2 | * | 11/2001 | G06Q 10/08 |

(Continued)

OTHER PUBLICATIONS

David Speights, "Return Fraud and Abuse: How to protect Profits", published by The retail Equation, on Feb. 2013, all pages (Year: 2013).*

(Continued)

*Primary Examiner* — Omar Zeroual
(74) *Attorney, Agent, or Firm* — Shook, Hardy & Bacon L.L.P.

(57) ABSTRACT

One or more identifiers are received based on an electronic scan of computer-readable indicia. The computer-readable indicia being coupled to an asset. The asset is associated with one or more shipping operations. Based at least in part on the one or more identifiers, it is determined that the asset is requested for return. Based at least in part on the one or more identifiers, a shipping label corresponding to a destination location for the asset to be returned to is automatically generated or a location for the asset to be delivered to is automatically changed.

20 Claims, 9 Drawing Sheets

Related U.S. Application Data

(60) Provisional application No. 63/013,311, filed on Apr. 21, 2020.

(56) References Cited

U.S. PATENT DOCUMENTS

| | | | |
|---|---|---|---|
| 10,977,461 B1* | 4/2021 | Boeselager | G06K 7/1413 |
| 10,997,545 B1* | 5/2021 | Bhagwat | G06K 19/0716 |
| 11,010,706 B1* | 5/2021 | Wier | G06Q 10/0837 |
| 2002/0046056 A1* | 4/2002 | Demarco | G06Q 30/06 |
| | | | 705/330 |
| 2002/0152093 A1 | 10/2002 | Chalmers et al. | |
| 2004/0193438 A1* | 9/2004 | Stashluk, Jr. | G06Q 30/02 |
| | | | 705/304 |
| 2005/0060165 A1* | 3/2005 | Knight | G06Q 10/08 |
| | | | 705/333 |
| 2005/0114221 A1* | 5/2005 | Walters | G06Q 10/0837 |
| | | | 705/1.1 |
| 2006/0020366 A1* | 1/2006 | Bloom | G06Q 20/00 |
| | | | 700/226 |
| 2006/0282277 A1* | 12/2006 | Ng | G06Q 10/08355 |
| | | | 705/333 |
| 2007/0299791 A1* | 12/2007 | Mack | G06Q 20/209 |
| | | | 705/402 |
| 2014/0279654 A1* | 9/2014 | Lievens | G06Q 10/087 |
| | | | 705/333 |
| 2015/0088781 A1* | 3/2015 | Gillen | G06Q 10/0837 |
| | | | 705/340 |
| 2015/0161562 A1* | 6/2015 | Felix | G06Q 40/02 |
| | | | 705/331 |
| 2015/0294261 A1* | 10/2015 | Adell | G06Q 10/083 |
| | | | 705/330 |
| 2015/0324745 A1* | 11/2015 | Goodall | G06Q 10/08 |
| | | | 705/337 |
| 2016/0052659 A1* | 2/2016 | Bowers | B65C 1/021 |
| | | | 156/64 |
| 2016/0189097 A1* | 6/2016 | Padmaraagam | G06Q 10/0833 |
| | | | 705/26.81 |
| 2017/0260010 A1* | 9/2017 | Bacallao | G06K 19/07758 |
| 2017/0270473 A1* | 9/2017 | La Gloria | G06K 7/10861 |
| 2018/0071046 A1* | 3/2018 | Foos | A61B 50/36 |
| 2018/0107978 A1* | 4/2018 | Drey | G06Q 10/0837 |
| 2018/0253687 A1* | 9/2018 | Bornitz | G06Q 10/08 |
| 2019/0005741 A1* | 1/2019 | Klausner | G07B 17/00016 |
| 2019/0108480 A1* | 4/2019 | Brock | G06Q 20/12 |
| 2019/0130044 A1* | 5/2019 | Sato | G06F 16/9577 |
| 2019/0147444 A1* | 5/2019 | Nelms | G06Q 20/047 |
| | | | 705/44 |
| 2019/0362308 A1* | 11/2019 | Memon | G06Q 10/0837 |
| 2019/0392445 A1* | 12/2019 | Klausner | G06F 16/953 |
| 2021/0150457 A1* | 5/2021 | Key | G06Q 10/083 |
| 2021/0150472 A1* | 5/2021 | Gillen | G06Q 10/0837 |
| 2022/0171578 A1* | 6/2022 | Ruan | G06Q 30/06 |
| 2022/0391836 A1* | 12/2022 | Shamoon | H04W 4/80 |

FOREIGN PATENT DOCUMENTS

| | | | | |
|---|---|---|---|---|
| WO | 02/73369 A2 | 9/2002 | | |
| WO | WO-02073369 A2 * | 9/2002 | | G06Q 10/08 |
| WO | WO-2012178047 A1 * | 12/2012 | | G06Q 10/0837 |
| WO | WO-2014166740 A1 * | 10/2014 | | G06Q 10/0837 |
| WO | WO-2017035532 A1 * | 3/2017 | | |
| WO | WO-2017081200 A1 * | 5/2017 | | B64F 5/60 |
| WO | WO-2018204287 A1 * | 11/2018 | | G06Q 10/08 |
| WO | WO-2019067965 A1 * | 4/2019 | | G06F 16/9554 |
| WO | WO-2019216226 A1 * | 11/2019 | | G06K 1/121 |
| WO | WO-2019229272 A1 * | 12/2019 | | G06Q 10/0837 |

OTHER PUBLICATIONS

Notice of Allowance received for U.S. Appl. No. 17/235,127, mailed on Feb. 29, 2024, 8 pages.

\* cited by examiner

ASSET RETURN TECHNOLOGY

CROSS-REFERENCE TO RELATED APPLICATIONS

This application claims priority to U.S. patent application Ser. No. 17/235,127 entitled "Asset Return Technology," filed Apr. 20, 2021, which claims priority to U.S. Provisional Patent Application No. 63/013,311 entitled "Improved Asset Return Technology," filed Apr. 21, 2020, which are incorporated by reference in their entirety.

BACKGROUND

Before an asset (e.g., a package or parcel) is returned by a consignee or recipient, it may go through various operations. For instance, after a user orders an item from an electronic commerce web application and inputs shipping information (e.g., the delivery destination address), the item may be placed in a package and routed to a sorting facility where the package is organized based on information associated with the package (e.g., size of package, destination address, etc.). After traversal of the package through the sorting facility, the package may be loaded into a carrier vehicle for delivery to the recipient at the delivery destination. However, the item may be damaged, the item may be the wrong item, or the item may otherwise be unacceptable by the recipient. In some instances, the recipient may then manually open a web application to facilitate the return of the item back to the shipping entity.

Typical scanning device technologies, printer technologies, and asset return technologies in general (e.g., web applications and carrier computers) include static components or are limited in functionality. Additionally, existing technologies consume an unnecessary amount of computing resources, such as CPU and computer network resources. As described in more detail herein, aspects improve each these technologies and computing resource consumption.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter. Further, alternative or additional embodiments exist other than those described in this summary section.

Some embodiments are directed to a computer-implemented method that comprises the following operations. At a first time, an indication that computer-readable indicia is electronically scanned by a computing device is received. The computer-readable indicia is coupled to an asset. The asset is shipped by a shipping entity and delivered to a destination location associated with a recipient of the asset. At least partially in response to the receiving of the indication, it is determined that the asset is requested to be returned back to the shipping entity. Based at least in part on content of the computer-readable indicia, the destination location is automatically changed, in a structured data record stored in computer memory, to a return location associated with the shipping entity.

Some embodiments are directed a system that includes one or more processors and one or more computer storage media storing computer-useable instructions that, when used by the one or more processors, causes the one or more processors to perform a method. In some aspects, the method comprises the following operations. At a first time, one or more identifiers are received based on an electronic scan of computer-readable indicia. The computer-readable indicia being coupled to an asset. The asset is associated with one or more shipping operations. Based at least in part on the one or more identifiers, it is determined that the asset is requested for return. Based at least in part on the one or more identifiers, a shipping label corresponding to a destination location for the asset to be returned to is automatically generated.

Some embodiments are directed to a computer storage media having computer-executable instructions embodied thereon that, when executed, by a processor, causes the processor to perform a method. In some aspects, the method includes the following operations. A mobile device electronically scans computer-readable indicia that is coupled to an asset. The asset is associated with one or more shipping operations. At least partially in response to the electronically scanning, the mobile device generates one or more portions of a user interface. The one or more portions are indicative of a prompt for a user to input verification information for a return of the asset. Based at least in part on the generating of the one or more portions, the mobile device generates a notification that includes a request to return the asset.

BRIEF DESCRIPTION OF THE DRAWINGS

Figure 1:
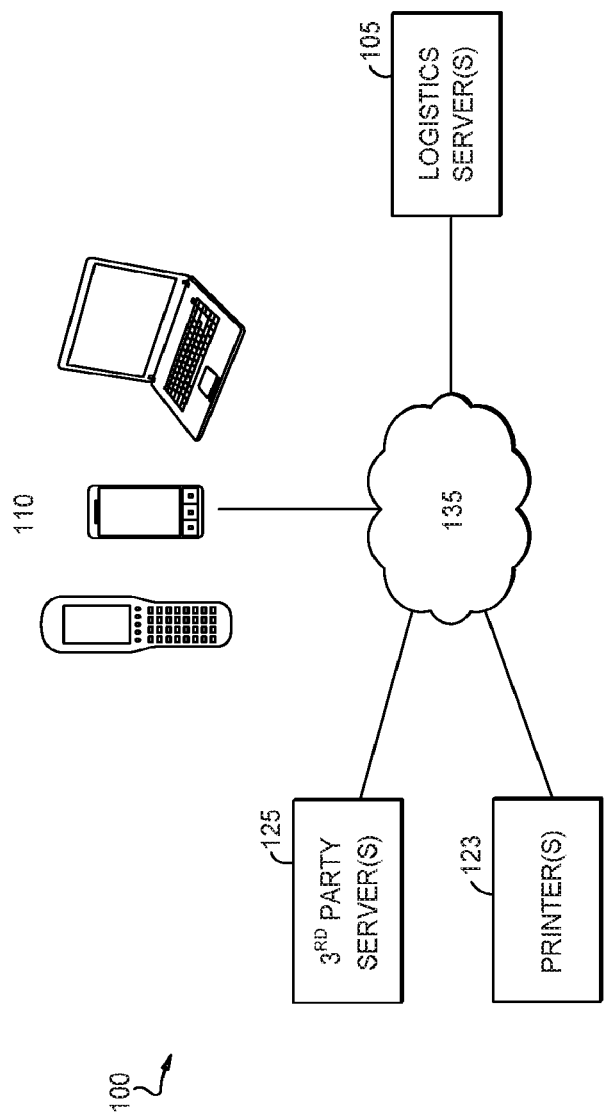

Having thus described the disclosure in general terms, reference will now be made to the accompanying drawings, which are not necessarily drawn to scale, and wherein:

FIG. 1 is a schematic diagram of an example computing environment in which aspects of the present disclosure are employed in, according to some embodiments.

Figure 2:
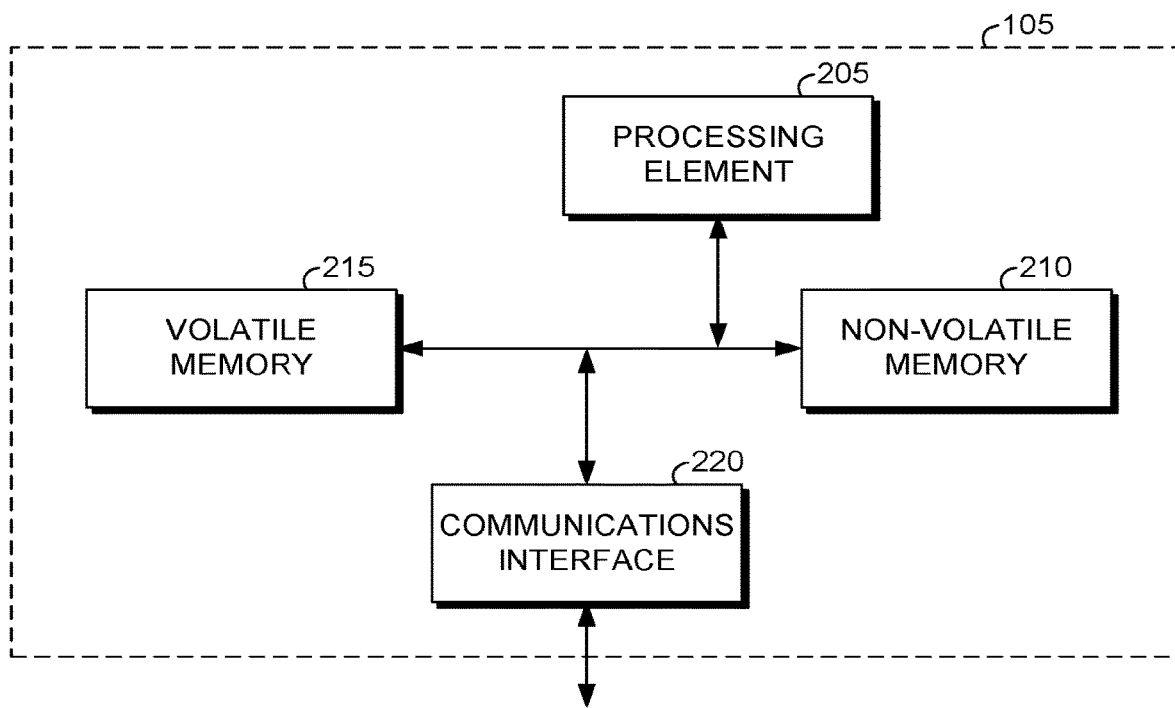

FIG. 2 is a schematic diagram of one or more logistics server(s) or third party server(s) in which aspects of the present disclosure are employed in, according to some embodiments.

Figure 3:
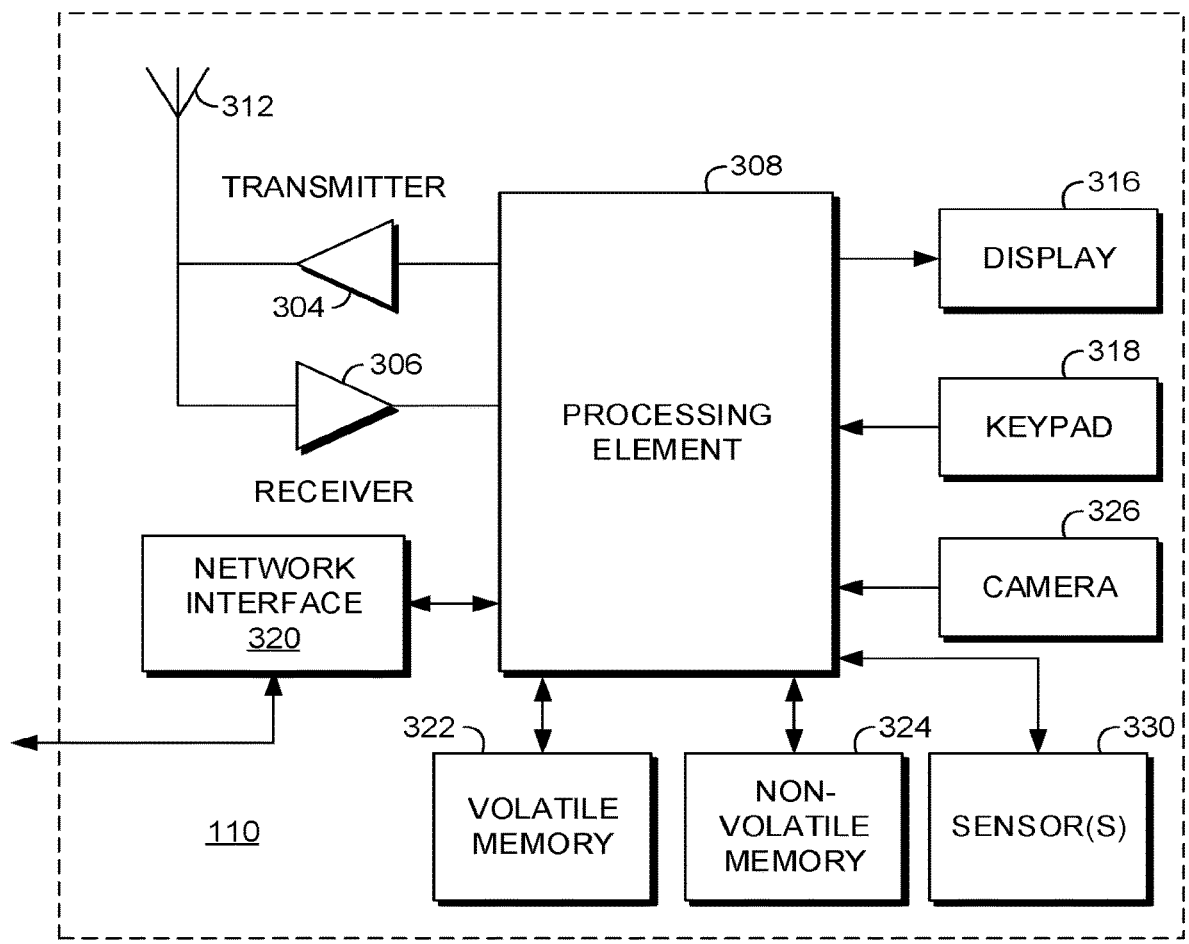

FIG. 3 is a schematic diagram of a computing entity in which aspects of the present disclosure are employed in, according to some embodiments.

Figure 4:
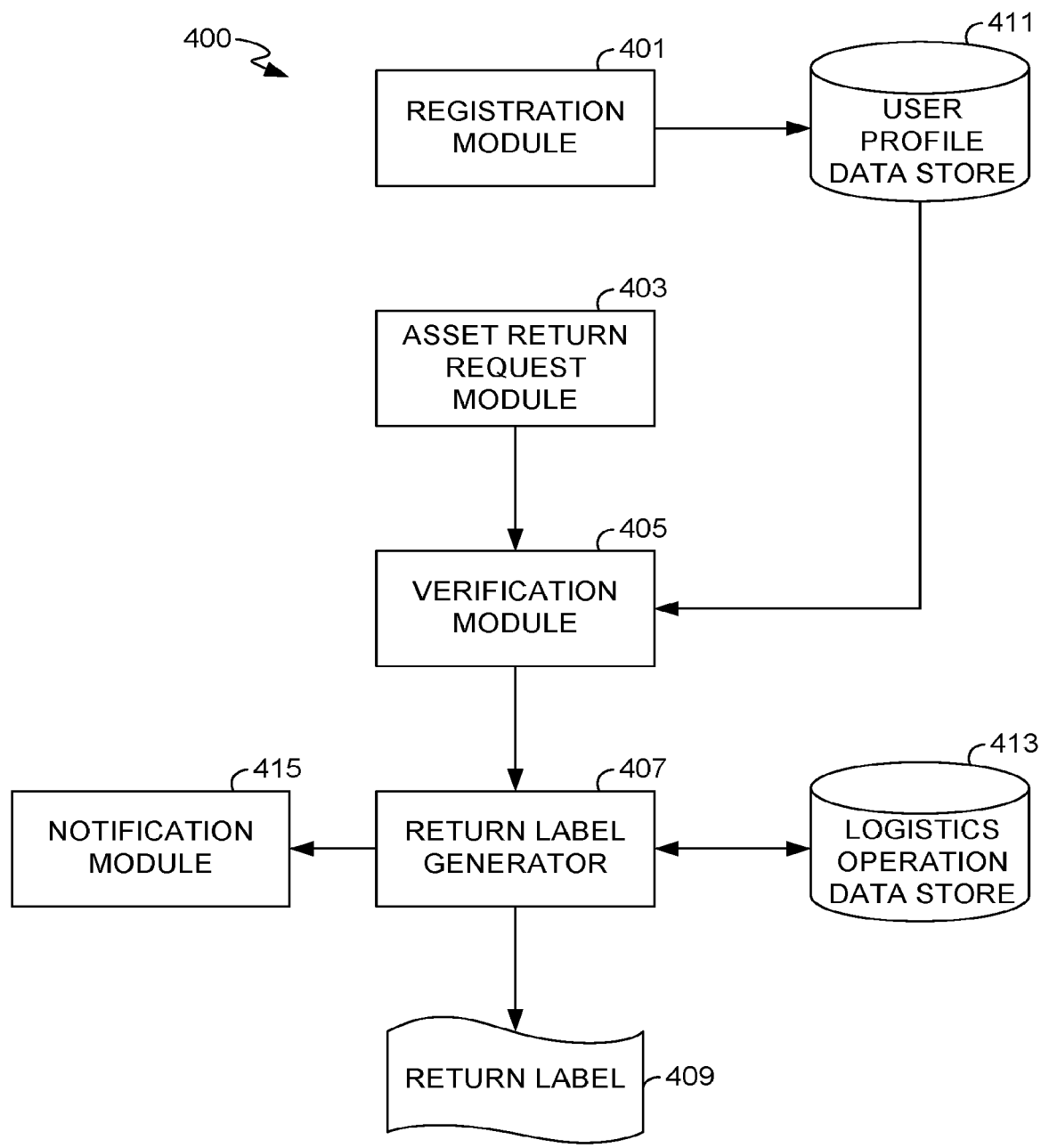

FIG. 4 is a block diagram of a system for generating a return shipping label, according to some embodiments.

Figure 5:
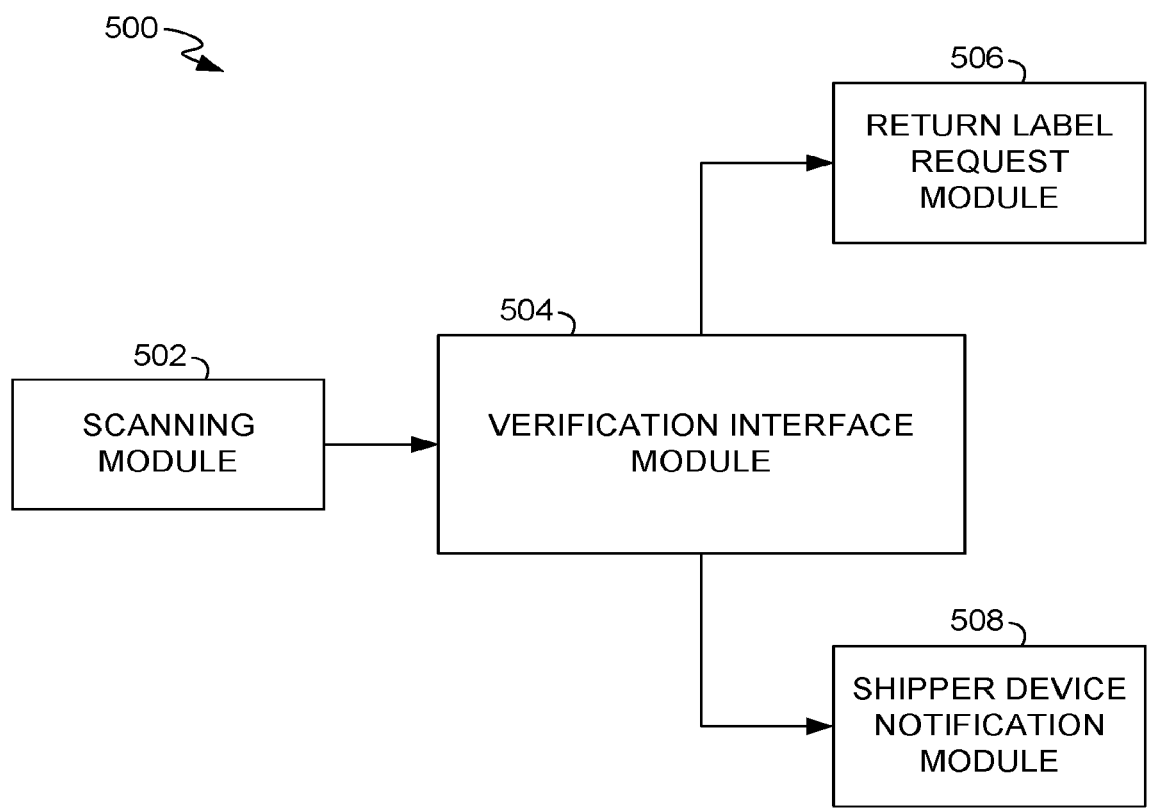

FIG. 5 is a block diagram of a system for generating a return label request and a notification, according to some embodiments.

Figure 6:
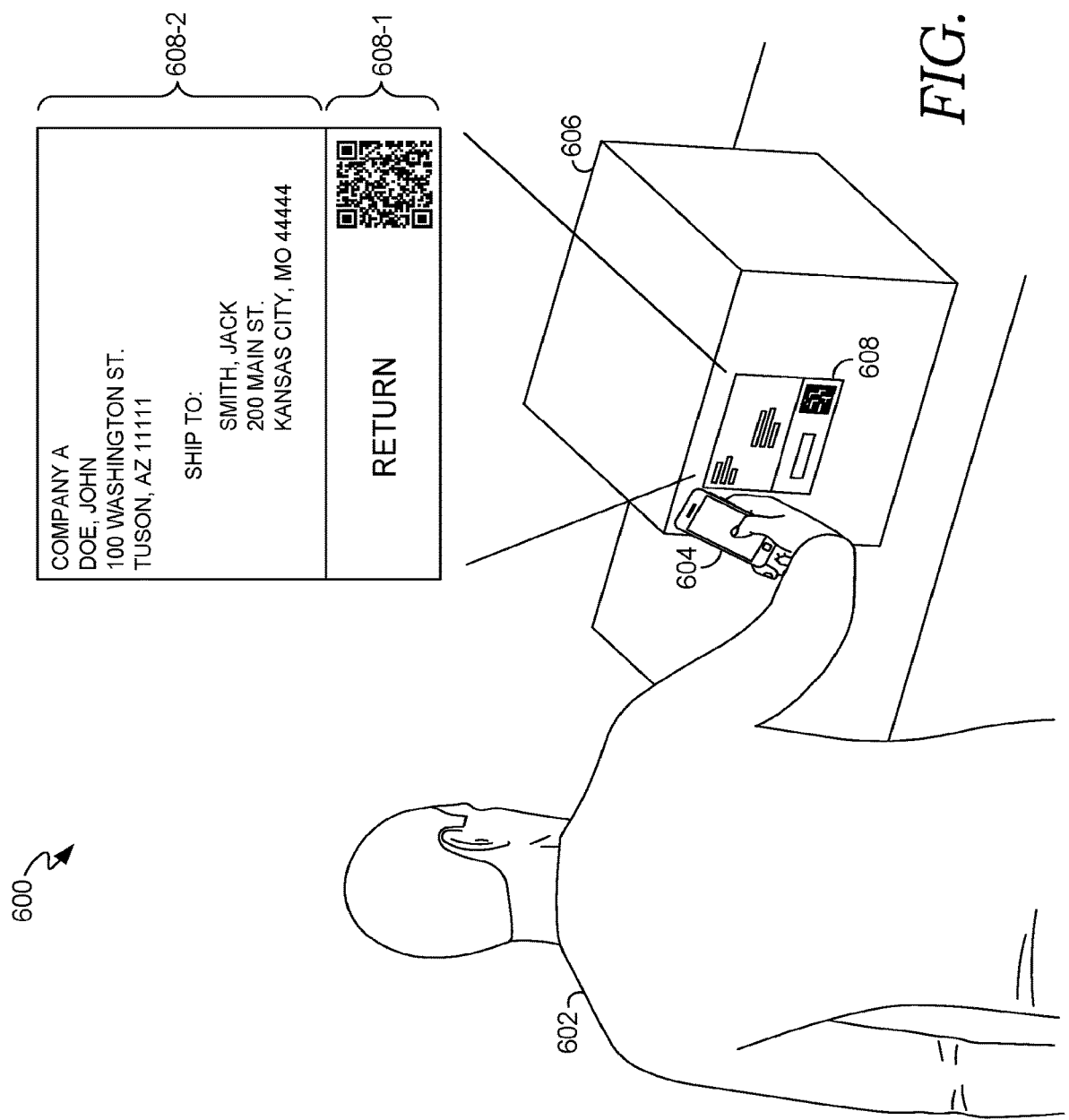

FIG. 6 is a schematic diagram of an environment illustrating how an asset return request may be generated and what a shipping label may look like, according to some embodiments.

Figure 7:
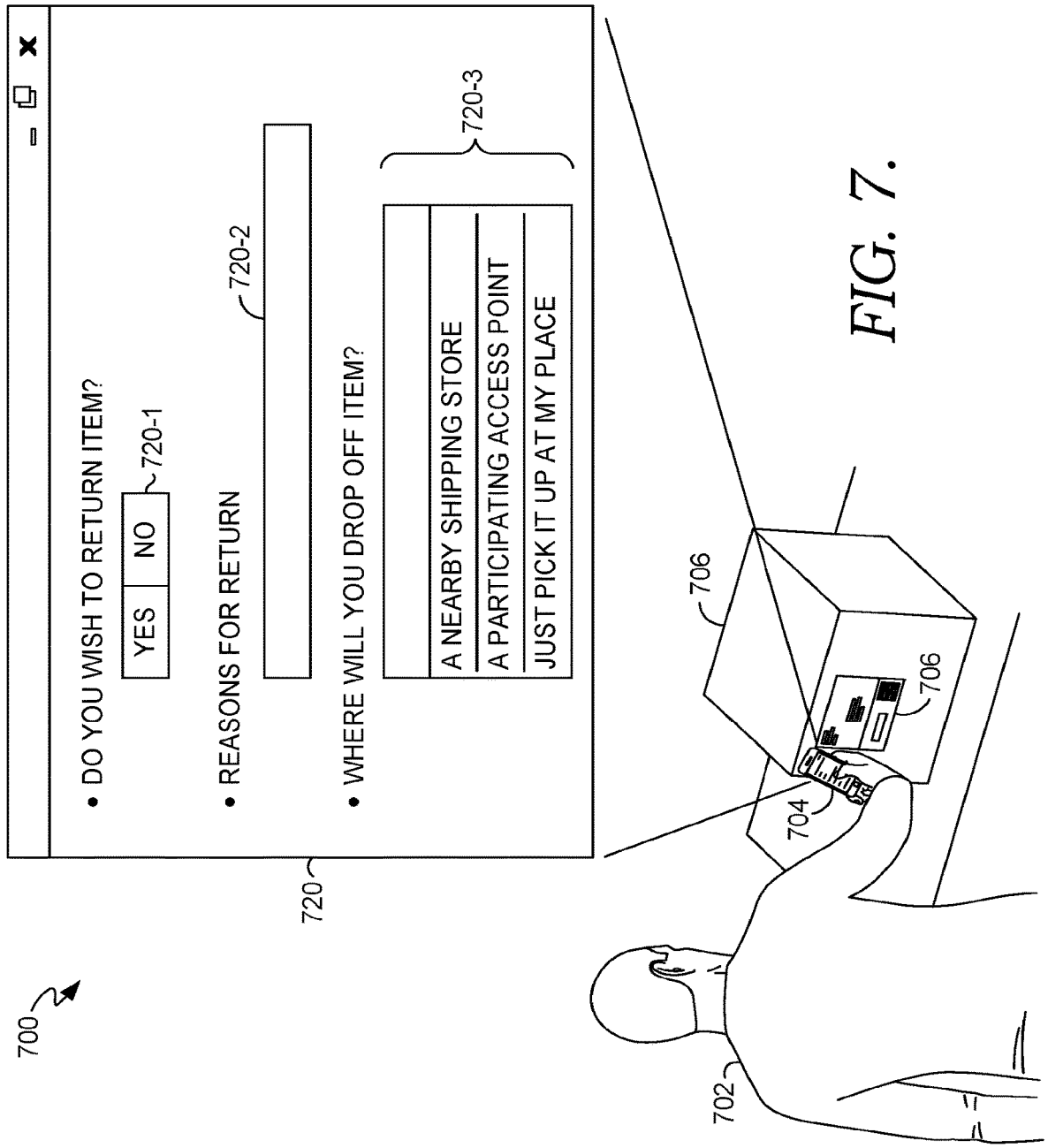

FIG. 7 is a schematic diagram of an environment illustrating how an asset return request may be generated and an associated user interface, according to some embodiments.

Figure 8:
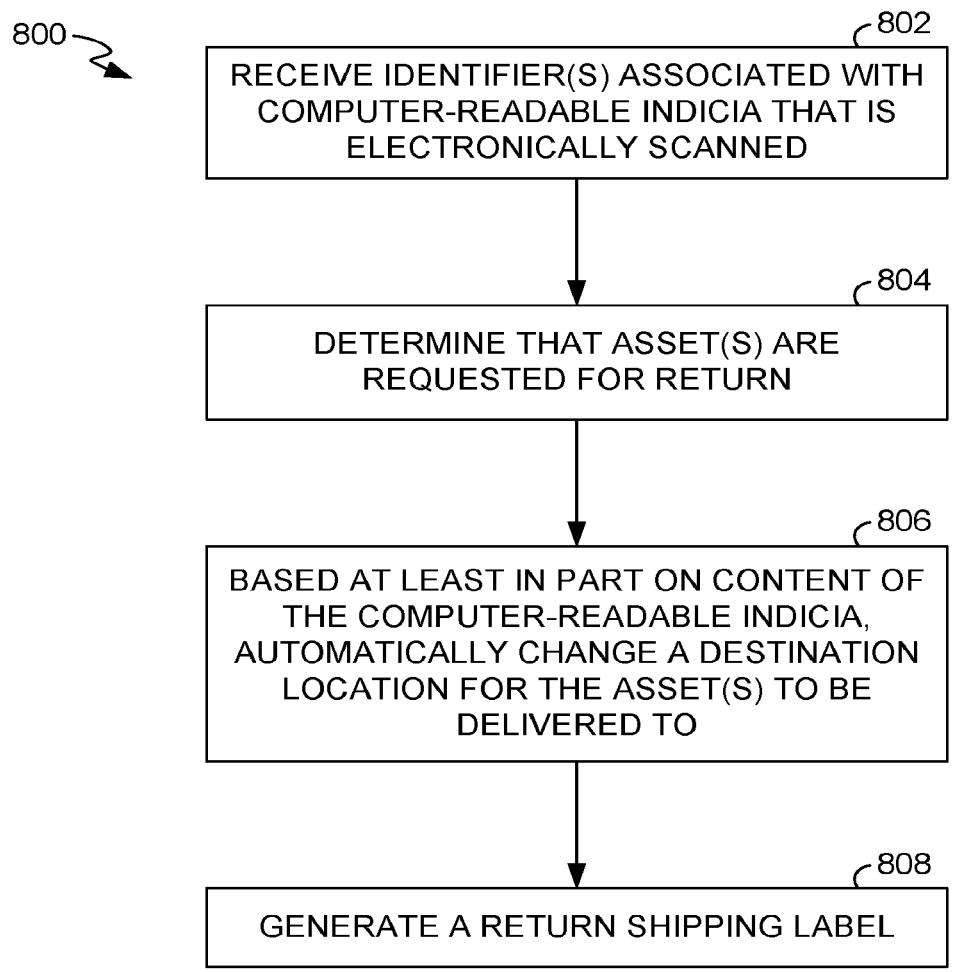

FIG. 8 is a flow diagram of an example process for automatically changing a destination location for one or more assets to be delivered to for the generating of a return label, according to some embodiments.

Figure 9:
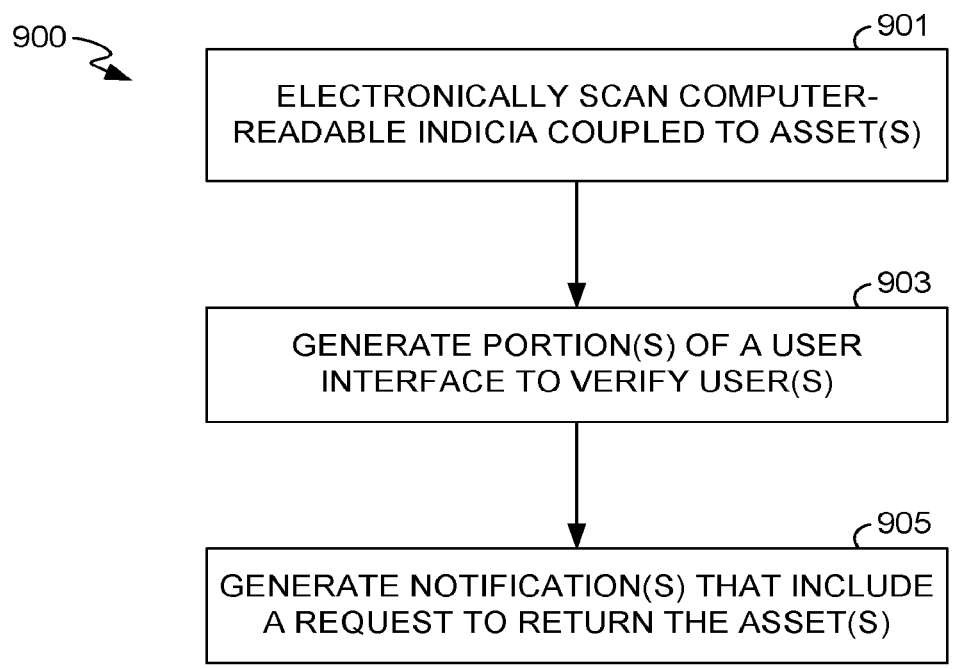

FIG. 9 is a flow diagram of an example process for generating one or more notifications that include a request to return one or more assets, according to some embodiments.

DETAILED DESCRIPTION OF THE INVENTION

The present disclosure will now be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. Like numbers refer to like elements throughout.

I. Overview

As described above, asset return technologies in general have limited functionality. For instance, carrier computers, web applications, or apps are limited in their functionality. For example, if a recipient desired to return an asset, the user may have to manually log onto a web application or app to manually input necessary information for the return request. These applications thus require tedious manual user input to complete user requests to return items. Alternatively, the recipient may have to travel to a carrier store, stand in line, and wait for carrier personnel to manually input return label information (e.g., return address, reasons for return, etc.) on a carrier computer and manually request a printing of a shipping label to return the asset to the new return address. In other instances, the recipient may request that carrier personnel travel to the address of the recipient to pick up the asset needing to be returned, after which carrier personnel may be subject to the same manual input and requests to generate a shipping label for the return of the asset on carrier computing entities, such as a Delivery Information Acquisition Device (DIAD). All of these manual computer user input actions may be arduous, time consuming, unnecessarily consume vehicle resources (e.g., fuel), and the like for both carrier personnel and recipients.

Various embodiments of the present disclosure improve these asset return technologies because they include new functions (e.g., automated functions) that no carrier computers or applications (or humans using computers or applications) perform based on new rules. For example, in response to electronically scanning computer-readable indicia (a first rule), embodiments automatically generate one or more portions of a user interface to prompt a user to input verification information (e.g., authentication credentials) for a return of the asset, which no carrier computers, web applications or apps currently do. In another example, based at least in part on receiving an indication that computer-readable indicia is electronically scanned, it can be determined that a recipient of the asset has requested a return of the asset. Based at least in part on content of the computer-readable indicia, a location for the asset to be delivered to can be automatically changed in a structured data record stored in computer memory, which no carrier computers or applications perform. The computer-readable indicia may contain the new address (e.g., a return address), which may be used for the change.

In some embodiments, the computer-readable indicia (e.g., a QR code) that is scanned may include new information, such as an asset ID and address of the site to facilitate a return. This new information may be used to automatically change data of the location in the structured data record. Additionally, some embodiments improve these asset return technologies because they automatically generate a shipping label based on the information in the computer-readable indicia or identifiers received from an electronic scan. The shipping label may contain the new address (e.g., a return address), which is included in the computer-readable indicia. In this way, users to not have to manually perform arduous computer inputs to request and facilitate the return of assets using static functionality but can use the new dynamic functionality described herein to automate the return of assets, thereby making returns less arduous, fuel-efficient, less time consuming, and the like.

Typical scanning technologies also have limited functionality or components. For example, typical scanning technologies, such as mobile application scanners (e.g., Quick Response (QR) scanners) illuminate a corresponding code so that a scanning device (e.g., a camera) can detect the illuminated light, which is then decoded. The decoding is often used for particular but limited functionality, such as redirecting users to websites. Some embodiments improve these scanning technologies via new functionality that scanning technologies do not currently employ. For example, some embodiments automatically change, in a structured data record, a location for an asset to be delivered to in response to receiving an indication that computer-readable indicia is electronically scanned. This may be indicative of automatically changing an original address destined for a recipient to an address corresponding to the site of return of the asset. In some embodiments, the computer-readable indicia (e.g., a QR code) that is scanned may include new information relative to existing QR codes, such as an asset ID and address of the site to facilitate a return. This information may be used to automatically change the location in the structured data record. Additionally, some embodiments improve these scanning technologies because they automatically generate a shipping label based on one or more new rules, such as the information in the computer-readable indicia or identifiers received from an electronic scan, which no scanning technologies do. The shipping label may contain the new address (a return address), which is included in the computer-readable indicia.

Other technologies, such as printer machines are also static and include limited functionality. For example, users, such as carrier personnel, may have to manually input information on a digital shipping label (e.g., destination address, date, service class, size of package, etc.). Users may then have to manually request a print of the label via an operating system on a carrier computer before the label is printed and before the user places the label on the package. Various embodiments of the present disclosure improve these printer machine technologies because they automate new functions that these printers (and humans using printers) have not performed before via one or more new rules. For example, no existing printer machines automatically generate or print a printing label based on automatically changing, in a structured data record, a location for the asset to be delivered to or based on the contents of the machine-readable indicia (e.g., which includes an address of the site of return of the asset).

As described above, existing technologies consume an unnecessary quantity of computing resources. For example, existing technologies cause CPU bottlenecks, decrease in throughput, or network bandwidth issues, among other things. This is because when a user requests a return, for example, carrier computers (e.g., at carrier stores) may be processing and printing multiple return requests at a single time or near the same time for customers waiting in line. Some embodiments improve this computing resource consumption because the return requests are largely shifted to recipients and recipient devices. For example, a user can use her mobile device to scan machine-readable indicia located on an asset, which automatically triggers a change of a destination location (shipping address is now return address) and/or automatically triggers a shipping label to be printed. In another example, user devices can be used to directly print shipping labels instead of carrier computers. In this way, carrier computers do not solely bear the burden for processing various return requests at substantially the same time. Rather, recipient users can help crowdsource returns, thereby allowing more data to be processed per unit of time to increase network bandwidth, throughput, and CPU functioning of carrier computers, among other things.

In is understood that although this overview section describes various improvements to conventional solutions and technologies, these are by way of example only. As such, other improvements are described below or will become evident through description of various embodiments. This overview is provided to introduce a selection of concepts in a simplified form that are further described below in the detailed description. This overview is not intended to: identify key features or essential features of the claimed subject matter, key improvements, nor is it intended to be used in isolation as an aid in determining the scope of the claimed subject matter.

II. Apparatuses, Methods, and Systems

Embodiments of the present disclosure may be implemented in various ways, including as apparatuses that comprise articles of manufacture. An apparatus may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double information/data rate synchronous dynamic random access memory (DDR SDRAM), double information/data rate type two synchronous dynamic random access memory (DDR2 SDRAM), double information/data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices/entities, computing entities, and/or the like. As such, embodiments of the present disclosure may take the form of an apparatus, system, computing device, computing entity, and/or the like executing instructions stored on a computer-readable storage medium to perform certain steps or operations. However, embodiments of the present disclosure may also take the form of an entirely hardware embodiment performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

III. Exemplary System Architecture

FIG. 1 is a schematic diagram of an example computing environment 100 in which aspects of the present disclosure are employed in, according to some embodiments. As shown in FIG. 1, this particular computing environment 100 includes one or more logistics servers 105 (e.g., a shipping company mainframe, a blade server, cloud computing nodes, or logistics store desktop) one or more third party servers 125 (e.g., an electronic commerce entity that hosts a marketplace web application) computing entities 110 (e.g., a mobile device, such as a DIAD or mobile phone), and one or more printers 123 (e.g., to print a shipping label), which are communicatively coupled via one or more networks 135. In some embodiments, "communicatively coupled" means that two or more components can perform data transportation between each other via a wired (e.g., ethernet or fiber-optic medium connected in a LAN) or wireless (e.g., IEEE 802.15.4) computer protocol network. Each of these components, entities, devices, systems, and similar words used herein interchangeably may be in direct or indirect communication with, for example, one another over the same or different wired and/or wireless networks. Additionally, while FIG. 1 illustrates the various system entities as separate, standalone entities, the various embodiments are not limited to this particular architecture. In some embodiments, there are more or fewer (or combined) components than illustrated in the environment 100. For example, there need not be a third party server 125 and/or a printer 123.

In various embodiments, the network(s) 135 represents or includes an IoT (internet of things) or IoE (internet of everything) network, which is a network of interconnected items (e.g., the printer(s) 123 and the mobile computing entity 110) that are each provided with unique identifiers (e.g., UIDs) and computing logic so as to communicate or transfer data with each other or other components. Such communication can happen without requiring human-to-human or human-to-computer interaction. For example, an IoT network may include the mobile computing entity 110 of an asset recipient, which is equipped with one or more sensors and transmitter in order to process and/or transmit data (e.g., a control signal) over the network 135 to the logistics server(s) 105, the printer(S) 123, and/or the third party server(s) 125. In the context of an IoT network, a computing device can be or include one or more local processing devices (e.g., edge nodes) that are one or more computing devices configured to store and process, over the network(s) 135, either a subset or all of the received or respective sets of data to the one or more remote computing devices (e.g., the computing entities 110 and/or the logistics server(s) 105) for analysis.

In some embodiments, the local processing device(s) described above is a mesh or other network of microdata centers or edge nodes that process and store local data received from the mobile computing entity 110, the logistics server(s) 105, the third party server(s) 125, and/or the printer(s) 123 and push or transmit some or all of the data to a cloud device or a corporate data center that is or is included in the one or more logistics server(s) 105. In some embodiments, the local processing device(s) store all of the data and only transmit selected (e.g., data that meets a threshold) or important data to the one or more logistics servers 105. Accordingly, the non-important data or the data that is in a group that does not meet a threshold is not transmitted. In various embodiments where the threshold or condition is not met, daily or other time period reports are periodically generated and transmitted from the local processing device(s) to the remote device(s) indicating all the data readings gathered and processed at the local processing device(s). In some embodiments, the one or more local processing devices act as a buffer or gateway between the network(s) and a broader network, such as the one or more networks 135. Accordingly, in these embodiments, the one or more local processing devices can be associated with one or more gateway devices that translate proprietary communication protocols into other protocols, such as internet protocols.

In some embodiments, the computing environment 100 represents a network of components that work together to facilitate the return of one or more assets. For example, in response to a mobile computing entity 110 (e.g., of an asset recipient) scanning computer-readable indicia located on a package, the mobile computing entity may communicate, via the network 135, with the logistics server(s) 105, which automatically causes a data record (e.g., of a database table) to be changed or more specifically, the address that the asset should be delivered to (e.g., based on a facility return address indicated in the computer-readable indicia). Additionally or alternatively, the communication, via the network 135, to the logistics server(s) 105 may cause the printer(s) 123 to print a return shipping label for the asset return request. For example, the logistics server(s) 105 may automatically send a control signal to the printer(s) 123, thereby causing the return label to be physically printed based on information indicated in the computer-readable indicia and the scan of the computer-readable indicia. Additionally or alternatively, the computing entity 110 may send one or more notifications (or control signals) that indicate the return request. For example, the computing entity 110 can transmit, via the network 110, a notification to the third party server(s) 125, which may be indicative of a request to an electronic commerce entity to return an item, which may facilitate other actions, such as reimbursement, pickup of the item requested for return, and the like. Alternatively or additionally, a similar notification can be transmitted to another computing entity 110, such as a shipper's mobile phone indicating that the recipient or consignee is requesting a return of the shipped asset.

1. Exemplary Analysis Computing Entities

FIG. 2 provides a schematic of a logistics server(s) 105 and/or the third party server(s) 125, according to particular embodiments of the present disclosure. In general, the terms computing entity, computer, entity, device, system, and/or similar words used herein interchangeably may refer to, for example, one or more computers, computing entities, desktops, mobile phones, tablets, phablets, notebooks, laptops, distributed systems, consoles input terminals, servers or server networks, blades, gateways, switches, processing devices, processing entities, set-top boxes, relays, routers, network access points, base stations, cloud computing nodes, virtual machines, virtual containers, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In particular embodiments, these functions, operations, and/or processes can be performed on data, content, information/data, and/or similar terms used herein interchangeably.

As indicated, in particular embodiments, the logistics server(s) 105 and/or the third party server(s) 125 may also include one or more communications interfaces 220 for communicating with various computing entities, such as by communicating data, content, information/data, and/or similar terms used herein interchangeably that can be transmitted, received, operated on, processed, displayed, stored, and/or the like.

As shown in FIG. 2, in particular embodiments, the logistics server(s) 105 and/or the third party server(s) 125 may include or be in communication with one or more processing elements 205 (also referred to as processors, processing circuitry, and/or similar terms used herein interchangeably) that communicate with other elements within the logistics server(s) 105 via a bus, for example. As will be understood, the processing element 205 may be embodied in a number of different ways. For example, the processing element 205 may be embodied as one or more complex programmable logic devices (CPLDs), microprocessors, multi-core processors, co-processing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present disclosure when configured accordingly.

In particular embodiments, the logistics server(s) 105 and/or the third party server(s) 125 may further include or be in communication with non-volatile media (also referred to as non-volatile storage, memory, memory storage, memory circuitry and/or similar terms used herein interchangeably). In particular embodiments, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases (e.g., parcel/item/shipment database), database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In particular embodiments, the logistics server(s) 105 and/or the third party server(s) 125 may further include or be in communication with volatile media (also referred to as volatile storage, memory, memory storage, memory circuitry and/or similar terms used herein interchangeably). In particular embodiments, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the logistics server(s) 105 with the assistance of the processing element 205 and operating system.

As indicated, in particular embodiments, the logistics server(s) 105 and/or third party server(s) 125 may also include one or more communications interfaces 220 for communicating with various computing entities, such as by communicating information/data, content, information/data, and/or similar terms used herein interchangeably that can be transmitted, received, operated on, processed, displayed, stored, and/or the like. Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the logistics server(s) 105 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, long range low power (LoRa), LTE Cat M1, NarrowBand IoT (NB IoT), and/or any other wireless protocol.

Although not shown, the logistics server(s) 105 and/or third party server(s) 125 may include or be in communication with one or more input elements, such as a keyboard input, a mouse input, a touch screen/display input, motion input, movement input, audio input, pointing device input, joystick input, keypad input, and/or the like. The logistics server(s) 105 may also include or be in communication with one or more output elements (not shown), such as audio output, video output, screen/display output, motion output, movement output, and/or the like.

As will be appreciated, one or more of the logistics server(s)'s 105 and/or third party server(s) 125 components may be located remotely, such as in a distributed system (e.g., a cloud computing system). Additionally or alternatively, the logistics server(s) 105 and/or the third party server(s) 125 may be represented among a plurality of computing devices. For example, the logistics server(s) 105 and/or the third party server(s) 125 can be or be included in a cloud computing environment, which includes a network-based, distributed/data processing system that provides one or more cloud computing services. Further, a cloud computing environment can include many computers, hundreds or thousands of them or more, disposed within one or more data centers and configured to share resources over the network(s) 135. Furthermore, one or more of the components may be combined and additional components performing functions described herein may be included in the logistics server(s) 105 and/or the third party server(s) 125 Thus, the logistics server(s) 105 and/or third party server(s) 123 can be adapted to accommodate a variety of needs and circumstances. As will be recognized, these architectures and descriptions are provided for exemplary purposes only and are not limiting to the various embodiments.

2. Exemplary Computing Entities

Computing entities 110 may be configured for electronically scanning computer-readable indicia, sending notifications, receiving notifications, and/or providing one or more portions of a user interface, among other things In some embodiments, a computing entity 110 is embedded within or otherwise coupled to the printer(s) 123 to facilitate the printing of shipping labels. In certain embodiments, computing entities 110 may be embodied as handheld computing entities, such as mobile phones, tablets, personal digital assistants, and/or the like, that may be operated at least in part based on user input received from a user via an input mechanism. Moreover, computing entities 110 may be embodied as onboard vehicle computing entities, such as central vehicle electronic control units (ECUs), onboard multimedia system, and/or the like that may be operated at least in part based on user input. Such onboard vehicle computing entities may be configured for autonomous and/or nearly autonomous operation however, as they may be embodied as onboard control systems for autonomous or semi-autonomous vehicles, such as unmanned aerial vehicles (UAVs), robots, and/or the like. As a specific example, computing entities 110 may be utilized as onboard controllers for UAVs configured for picking-up and/or delivering packages to various locations, and accordingly such computing entities 110 may be configured to monitor various inputs (e.g., from various sensors) and generated various outputs. It should be understood that various embodiments of the present disclosure may comprise a plurality of computing entities 110 embodied in one or more forms (e.g., parcel security devices kiosks, mobile devices, watches, laptops, carrier personnel devices (e.g., Delivery Information Acquisition Devices (DIAD)), etc.)

As will be recognized, a user may be an individual, a family, a company, an organization, an entity, a department within an organization, a representative of an organization and/or person, and/or the like—whether or not associated with a carrier. In particular embodiments, a user may operate a computing entity 110 that may include one or more components that are functionally similar to those of the logistics server(s) 105. FIG. 3 provides an illustrative schematic representative of a computing entity 110 that can be used in conjunction with embodiments of the present disclosure. In general, the terms device, system, computing entity, entity, and/or similar words used herein interchangeably may refer to, for example, one or more: computers, computing entities, desktops, mobile phones, micro-computers (e.g., RASBERY PI), tablets, phablets, notebooks, laptops, distributed systems, vehicle multimedia systems, autonomous vehicle onboard control systems, watches, glasses, key fobs, radio frequency identification (RFID) tags/readers, ear pieces, scanners, imaging devices/cameras (e.g., part of a multi-view image capture system), wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing entities 110 can be operated by various parties, including carrier personnel (sorters, loaders, delivery drivers, network administrators, and/or the like). As shown in FIG. 3, the computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively. In some embodiments, the computing entity 110 includes one or more sensors 330 (e.g., a camera with object detection capabilities). The one or more sensors 330 can be one or more of: a pressure sensor, an accelerometer, a gyroscope, a geolocation sensor (e.g., GPS sensor), a radar, a lidar, sonar, ultrasound, an object recognition camera, and any other suitable sensor used to help facilitate the return of an asset.

The signals provided to and received from the transmitter 304 and the receiver 306, respectively, may include signaling information in accordance with air interface standards of applicable wireless systems. In this regard, the computing entity 110 may be capable of operating with one or more air interface standards, communication protocols, modulation types, and access types. More particularly, the computing entity 110 may operate in accordance with any of a number of wireless communication standards and protocols, such as those described above with regard to the logistics server(s) 105. In a particular embodiment, the computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the computing entity 110 may operate in accordance with multiple wired communication standards and protocols, such as those described above with regard to the logistics server(s) 105 via a network interface 320.

Via these communication standards and protocols, the computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The computing entity 110 can also download changes, add-ons, and updates, for instance, to its firmware, software (e.g., including executable instructions, applications, program modules), and operating system.

According to particular embodiments, the computing entity 110 may include location determining aspects, devices, modules, functionalities, and/or similar words used herein interchangeably. For example, the computing entity 110 may include outdoor positioning aspects, such as a location module adapted to acquire, for example, latitude, longitude, altitude, geocode, course, direction, heading, speed, universal time (UTC), date, and/or various other information/data. In particular embodiments, the location module can acquire information/data, sometimes known as ephemeris information/data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information can be determined by triangulating the computing entity's 110 position in connection with a variety of other systems, including cellular towers, Wi-Fi access points, and/or the like. Similarly, the computing entity 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices/entities (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the computing entity 110 to interact with and/or cause display of information from the logistics server(s) 105 and/or third party server(s) 125, as described herein. The user input interface can comprise any of a number of devices or interfaces allowing the computing entity 110 to receive information/data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

As shown in FIG. 3, the computing entity 110 may also include an camera, imaging device, and/or similar words used herein interchangeably 326 (e.g., still-image camera, video camera, IoT enabled camera, IoT module with a low resolution camera, a wireless enabled MCU, and/or the like) configured to capture images. The computing entity 110 may be configured to capture images via the onboard camera 326, and to store those imaging devices/cameras locally, such as in the volatile memory 322 and/or non-volatile memory 324. As discussed herein, the computing entity 110 may be further configured to match the captured image data with relevant location and/or time information captured via the location determining aspects to provide contextual information/data, such as a time-stamp, date-stamp, location-stamp, and/or the like to the image data reflective of the time, date, and/or location at which the image data was captured via the camera 326. The contextual data may be stored as a portion of the image (such that a visual representation of the image data includes the contextual data) and/or may be stored as metadata (e.g., data that describes other data, such as describing a payload) associated with the image data that may be accessible to various computing entities 110.

The computing entity 110 may include other input mechanisms, such as scanners (e.g., barcode scanners), microphones, accelerometers, RFID readers (or Near-Field Communication (NFC) readers), and/or the like configured to capture and store various information types for the computing entity 110. For example, a scanner may be used to capture parcel/item/shipment information/data from an item indicator disposed on a surface of a shipment or other item. In certain embodiments, the computing entity 110 may be configured to associate any captured input information/data, for example, via the onboard processing element 308. For example, scan data captured via a scanner may be associated with image data captured via the camera 326 such that the scan data is provided as contextual data associated with the image data.

The computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, information/data, applications, programs, program modules, scripts, source code, object code, byte code, compiled code, interpreted code, machine code, executable instructions, and/or the like to implement the functions of the computing entity 110. As indicated, this may include a user application that is resident on the entity or accessible through a browser or other user interface for communicating with the logistics server(s) 105 and/or various other computing entities.

In another embodiment, the computing entity 110 may include one or more components or functionality that are the same or similar to those of the logistics server(s) 105, as described in greater detail above. As will be recognized, these architectures and descriptions are provided for exemplary purposes only and are not limiting to the various embodiments.

FIG. 4 is a block diagram of a system 400 for generating a return shipping label, according to some embodiments. Although the system 400 includes specific modules or components that operate in a particular order, it is understood that this is representative only. As such, there may be more or fewer components than illustrated, components may be combined, and/or functionality can be performed in a different order than illustrated. For example, in some embodiments, a physical return label 409 is not printed or there is no label that is generated via the return label generator 407. In some embodiments, each of the components of the system 400 are located within the logistics server(s) 105. Alternatively, in some embodiments, the components of the system 400 are located within a different entity (e.g., computing entity 110) and/or are distributed among one or more components of the environment 100.

The registration module 401 is generally responsible for registering one or more shippers and/or recipients of an asset. A "recipient" of an asset as described herein is a consignee (and not a consignor) of the asset, a buyer of the asset, and/or any other suitable person or entity that receives an asset. In various embodiments, the receiving of the asset can occur at the final delivery destination (known as "last mile delivery") (e.g., a recipient's home address) or other location, such as a locker bank, retailer store, access point, and/or the like. Registering may include receiving and storing user input of data, such as shipper name, designated asset recipient(s) name, shipper mobile phone number, recipient mobile phone number, shipper address, device data (e.g. model and OS) of shipper and/or recipient, recipient address (corresponding to the delivery location), credit card information of shipper, authentication credentials of shipper/recipient, particular delivery request data (e.g., specific shipment attributes, such as a specific shipment request at a particular delivery address), the address or location of the carrier store facility that the recipient will drop the asset off at should the recipient request a return of the asset, and/or any other suitable data needed to process a shipment and/or a return of assets for shipments. All of this data can be stored to the user profile data store 411 (e.g., a database).

The asset return request module 403 is generally responsible for receiving an asset return request of a recipient to initiate the process of returning one or more assets. The asset return request module 403 can be automatically triggered or be triggered via manual user input. For example, in some embodiments, a recipient of an asset may determine that he or she wants to return an item because it is broken or is the wrong item. Responsively, the recipient, holding his or her mobile device, can open up an electronic scanning reader application locally stored to the mobile device. Responsively, a camera device within the mobile device may activate. The recipient may then hold the camera device near (e.g., within a distance and viewing threshold) computer-readable indicia located on an asset such that the camera device captures and decodes the computer-readable indicia. In response to the camera device or other electronic scanning device of the mobile device electronically scanning the computer-readable indicia, the mobile device may automatically send a request (e.g., over the network 135) to the logistics server(s) 105, which is received by the asset return request module 403. The request may be indicative of a request to return an item.

In some embodiments, the request described above to return one or more items includes metadata, such as device fingerprint of the recipient's device (e.g., model, OS, etc.), recipient's mobile phone number, the recipient's IP address, and the like. The verification module 405 in particular embodiments uses the metadata within the request and the request itself to verify the recipient based on data located in the user profile data store 411. For example, the request to return an item may include metadata of the mobile device phone number of the mobile device that scanned the computer-readable indicia. This data may be matched to data within the user profile data store 411 (e.g., registered mobile device phone numbers, device fingerprints, recipient name, and the like) to authenticate the recipient and/or determine that the recipient is authorized to return an item.

In some embodiments, the verification module 405 includes authentication and authorization back-end functionality that is to be provided to a user interface of a web application or app and analyzed in response to user input. For example, in response to a mobile device associated with a recipient scanning machine-readable indicia, the mobile device may display a web or app page that prompts the recipient to input his or her name, authentication information (e.g., password), shipper, etc. In response to receiving an indication that the user has input this information, the mobile device may transmit this information to the logistics server(s) 105, which is then received by the verification module 405 and compared against the data in the user profile data store 411 in order to authenticate and authorize the recipient or the recipient's mobile device.

In some embodiments, in response to the verification module 405 verifying the recipient, the return label generator 407 automatically generates a return shipping label. In some embodiments, the return label generator 407 additionally or alternatively changes, in a structured data record stored in the logistics operation data store 413, a location for the asset to be delivered to. In some embodiments, this changing is based on data located in the computer-readable indicia. "Computer-readable indicia" as described herein is any tag (e.g., RFID or NFC tag) information, bar code, data matrix, numbers, lines, shapes, and/or other suitable identifier that is machine-readable (and tend not to be readable by a human) because machines can process the data. In some embodiments, the computer-readable indicia includes an ID of the asset that the computer-readable indicia is coupled to and the address or location of the site where the asset is to be returned to (e.g., an address of a retailer that sold the item of the asset). This information may be contained within the computer-readable indicia even before a request has been made to return an asset (e.g., as soon as a shipping label is placed on an asset by a shipper or carrier personnel) in case the asset is requested to be returned at some future time. Accordingly, some embodiments automatically replace a destination location or address (e.g., a recipient's address as located in the logistics operation data store 413) in a data record to the address or location of the site where the asset is to be returned to (e.g., third party retailer warehouse). In some embodiments, the return label generator 407 automatically generates a new label by importing or copying information decoded from the computer-readable indicia. For example, as described above, the verification module 505 can read the decoded information that indicates the address of the return site and responsively generate a new shipping label that includes the address of the return site, except that the address is in natural language that is human-readable.

In some embodiments, the output of the return label generator 407 is altered or modified data relative to the previous steps. For example, the output of the return label generator 407 can be structured, tagged, cleaned, and/or otherwise include data in a standardized format (e.g., a digital shipping label), which altogether, is different than data input by users or the components 401, 403, and/or 405 (which may be non-standardized or unstructured). For example, the output can be a field or standardized data record that includes: the name of the recipient, the address or location (e.g., geo-coordinates) of the facility to return the asset to, the address or location of the carrier store facility (or access point) that the recipient will drop the asset off at, the reasons for requesting a return the asset, a request to print the generated label, the ID of the asset requested to be returned, and/or a shipping label that contains this information.

In some embodiments, in response to the return label generator 407 generating a shipping label to return the asset(s) requested to be returned, a return label 409 is caused to be printed (e.g., by the printer(s) 123). For example in some embodiments, in response to the return label generator 407 generating a return label, this component can automatically send a control signal (e.g., via the network 135) to the printer(s) 123, which causes the printer(s) 123 at a particular carrier store (e.g., as indicated in the user profile data store 411 and/or the logistics operation data store 413) or access point (e.g., a participating retailer) to automatically print a tangible copy of the generated return label 409. In this way, for example, when a recipient travels to a carrier store (e.g., a store that offers full-service packaging and shipping services) or access point, the label may already be printed such that the label can quickly be fixed to the asset requested for return without carrier personnel having to manually enter this information after the recipient arrives, which is tedious as described above.

In alternative embodiments, the printer(s) 123 may be located at the recipient's or other user's home, such that a control signal is sent to print the generated labels 409 so that the recipient or other user can be the entity to place the return label on the asset that has been requested for return. In some embodiments, a control signal need not be sent directly to the printer(s) 123. Rather, in some embodiments, before the return label 409 is printed, a recipient may take the asset requested for return to a carrier store or access point. A scanning device of the clerk or other carrier personnel may then scan the computer-readable indicia (which may have already been scanned by the recipient per the asset return request module 403) located on the original shipping label (which includes the recipient's address or other destination location). In response to this scanning device scanning the computer-readable indicia, the return label 409 is printed. The clerk or other carrier personnel may then affix the return label 409 over the old label with the original computer-readable indicia still viewable (i.e., it is not completely covered by the return label 409). In this way, if there is another issue with the asset downstream, such as another defect when it is ultimately shipped to the recipient again, the same process can be repeated using the computer-readable indicia. After the clerk or other carrier personnel affixes the return label 409 over the old label, the asset is returned to the address as indicated in the new return label 409.

The notification module 515 is generally responsible for generating and sending notifications to one or more devices indicating that a return label has been generated and/or associated information. For example, the notification module 515 can transmit, via an email channel (or other channel, such as SMS text), a new tracking number for tracking the asset as it gets returned and/or the new asset/item that ultimately gets resent to the recipient. Alternatively or additionally, a proof of tendering notification may be transmitted to a shipper device (e.g., the third party server(s) 125 or shipper's mobile device) and/or recipient device (e.g., computing entity 110) indicating that the asset was indeed delivered to the recipient notwithstanding the asset was requested for return.

FIG. 5 is a block diagram of a system for generating a return label request and a notification, according to some embodiments. Although the system 500 includes specific modules or components that operate in a particular order, it is understood that this is representative only. As such, there may be more or fewer components than illustrated, components may be combined, and/or functionality can be performed in a different order than illustrated. For example, in some embodiments, the shipper device notification module 508 is not present. In some embodiments, each of the components of the system 500 are located within the one or more computing entities 110. Alternatively, in some embodiments, the components of the system 400 are located within a different entity (e.g., third party server(s) 125) and/or are distributed among one or more components of the environment 100.

The scanning module 502 electronically scans or reads computer-readable indicia located on an asset. A user, such as an asset recipient, may determine that he or she will return an asset back to the consignor, shipper, or other location (e.g., an access point). The user may have a locally stored application on his or her mobile device (e.g., a smart phone). In response to opening or selecting the application, the user may select an electronic scanning feature (e.g., a QR scanner), which may responsively activate a camera device or scanner. In response to the camera or scanner being within a distance, range, and/or viewing frame or capability threshold of the computer-readable indicia, the scanning module 502 may automatically capture and decode the computer-readable indicia.

In some embodiments, in response to the scanning module 502 electronically scanning or reading the computer-readable indicia, the mobile device (or computing entity) that includes the camera device or scanner, automatically sends an asset return request to a computing device, which is then automatically received by the asset return request module 403 as described in FIG. 4. Alternatively or additionally, in some embodiments, in response to the scanning module 502 scanning or reading the computer-readable indicia, the computing entity opens (e.g., automatically or via link that is automatically generated upon a decode of the computer-readable indicia) the verification interface module 504 (e.g., a web or app page) that includes fields or other elements configured to receive authentication and/or authorization information from the recipient. For example, there may be a username and/or password field, a field that prompts the user to input reasons why the recipient wants to return the asset, a field that prompts the user to input a time (e.g., a date/date range) for when the recipient wants the new or acceptable item/asset shipped to her, a field that prompts the user to indicate whether the user will print the label herself and have carrier personnel pick the asset up at her place of residence (or other location) or travel to a particular shipping store (and if so, what specific asset drop-off location in order to automatically print a shipping label at that location), and/or the like.

In some embodiments, in response to receiving the user input via the verification interface module 504, the computing entity transmits (e.g., automatically) a return label request via the return label request module 506 (e.g., to the logistics server(s) 105) to request that a shipping label be generated for the return of the asset. In some embodiments, the return label request that is transmitted is received by the asset return request module 403 as described with respect to FIG. 4, after which the modules 405, 407, and/or 415 may perform their respective functionalities.

Additionally or alternatively in some embodiments, in response to receiving the user input via the verification interface module 504, the computing entity transmits (e.g., automatically) a notification via the shipper device notification module 508 (e.g., to the logistics server(s) 105) to notify one or more computing devices associated with a shipper (e.g., the mobile computing entity 110 and/or the third party server(s) 125) that the recipient has requested that an asset be returned. In some embodiments, this notification can be identical or similar to the notification sent via the notification module 415 of FIG. 4.

FIG. 6 is a schematic diagram of an environment 600 illustrating how an asset return request may be generated and what a shipping label may look like, according to some embodiments. The environment 600 includes a user 602 (e.g., a recipient) that is holding a mobile device 604, which electronically scans or reads the computer-readable indicia 608-1 of the shipping label 608 located on the asset 606. In some embodiments, the mobile device 604 represents the computing entity 110 of FIG. 1.

The user 602 may receive the asset 606 from a shipper (e.g., directly from a shipper or via a web application transaction to order an associated item). The user 602 may then decide that the asset 606 or one or more items within the asset 606 are not suitable for one or more reasons, such as damage, the wrong item, not enough items, or the like. Accordingly, instead of the user 602 physically travelling to a carrier store or interfacing with a web application for extensive manual input to facilitate the return of the asset 606, as is typical and conventional with existing technologies and in the shipping industry, an asset return request may be automatically generated, as well as other functionality described herein, such as with respect to FIGS. 4 and 5. For example, the user may open up or select an app on her mobile device 604, which causes a scanner application to activate. The user 602 may then orient a camera device or scanning device toward the shipping label 608 such that the computer-readable indicia 608-1 is in a field of view of the camera device.

In response to the camera device or other component within the mobile device 604 decoding the computer-readable indicia 608-1, a request or notification may be transmitted (e.g., automatically) to one or more computing devices, which may include a request to print a return shipping label (or more specifically a portion to replace the natural language section 608-2) of the shipping label 608 based on information within the computer-readable indicia 608-1. In some embodiments, this request or notification may be the request and/or notification as described with respect to the return label request module 506 and/or the shipper device notification module 508.

The shipping label 608 includes a natural language section 608-2 and computer-readable indicia 608-1. The natural language section 608-2 includes human-readable natural language indicia, such as sender (e.g., recipient) address information, as well as the address and/or other location (e.g., geo-coordinates) information where the asset 606 is shipped to. Originally, the natural language section 608-2 may include sender address and/or other information of the shipper and an address and/or other information of the recipient. However, when a return label is generated and printed (e.g., the return label 409), in some embodiments, the natural language section 608-2 is replaced by a new natural language section where the sender information now includes the recipient (i.e., because the recipient now want to send the asset back), and/or the "shipped to" or recipient information now includes the site of return address and/or other location information. And in some embodiments, regardless of this change to the natural language section 608-2, the computer-readable indicia 608-2 remains unchanged throughout all delivery phases. This is because in some embodiments, the computer-readable indicia 608-1 always includes the address and/or other location of a site of return for the asset (or items within an asset) in case the asset has to keep being returned for some reason. In some embodiments, the shipping label 608 additionally or alternatively includes other information, such as a tracking code (to track an asset as it moves along or within a logistics network or delivery route), delivery service type (e.g., "next day air"), weight of asset, billing information, name of item/asset, and/or other computer-readable indicia, such as bar codes and the like.

In some embodiments, information contained in the computer-readable indicia 608-1 is included in the asset return request and is used to generate a return label. In some embodiments, the computer-readable indicia 608-1 includes the address or location for the site of return (e.g., an address of a retailer warehouse) and/or asset ID. In various embodiments, in response to this information being scanned by the mobile device 604, it is transmitted (e.g., via the return label request module and/or the shipper device notification module 508) to one or more shipping devices so that the new shipping label natural language section (similar to 608-2) can be changed and be generated, as described with respect to the return shipping label 409, for example.

FIG. 7 is a schematic diagram of an environment 700 illustrating how an asset return request may be generated and an associated user interface, according to some embodiments. The environment 700 includes a user 702 (e.g., a recipient) that is holding a mobile device 704, which electronically scans or reads the computer-readable indicia of the shipping label 708 located on the asset 706. Subsequent to the scan, the user interface 720 is displayed. In some embodiments, the mobile device 704 represents the computing entity 110 of FIG. 1. In some embodiments, the environment 700 represents the same environment 600 and vice versa, except with the additional functionality associated with the user interface 720. For example, the user 702 may be the user 602. The mobile device 704 may be the same mobile device 604. The asset 706 may represent the asset 606. And the shipping label 708 may represent the same shipping label 608. In some embodiments, the user interface 720 represents or is generated by the verification interface module 505 as described with respect to 504.

In response to the mobile device 704 electronically scanning the computer-readable indicia on the shipping label 708, a request may be generated to return the asset 706. In some embodiments, in response to the generating this asset return request, the user interface 720 and/or associated web or app pages are automatically displayed (e.g., by the verification interface module 504). For example, an authentication page may first be rendered which prompts the user 702 to input his/her username and/or password and responsively the user interface 720 is rendered (e.g., because the verification module 405 has verified that the mobile device 704/user 702 is located within the user profile data store 411). Alternatively or additionally, in some embodiments the user interface 720 and/or associated authentication/authorization pages are rendered manually on the mobile device 704. For example, once the user 702 determines that she wants to return the asset 706, he or she may manually select an app or navigate to a web page that includes the user interface 720. In some embodiments, the application that activates the camera/scanner as described with respect to the mobile device 604 is the same application responsible for rendering the user interface 720 (e.g., the scanning module 502 and verification interface module 504 are included in the same application). In other embodiments, these are separate applications stored to the mobile device 704.

The user interface 720 is configured to receive user input for changing and address location and/or generating a new shipping label, according to particular embodiments. Although the user interface 720 represents specific elements, features, buttons, menus, with a particular look and feel, it is understood that this is representative only and that any particular element, feature, button, menu, and look and feel may exist or replace the illustrated features. Moreover, more features may be added or removed. For example, there may not be a prompt that requests the user 702 to input where the user 702 will drop off the item.

The buttons 720-1 are selectable by the user 702 to ensure the user 702 indeed wishes to return the asset 706. The field 720-1 is configured to receive natural language input by the user 702, such that the user can specify why the user 702 wishes to return the asset 702. For example, the user 702 can indicate that an item is: damaged, is the wrong item or different than the item ordered, an attribute of the item (e.g., color, size, etc.) is incorrect or different than the attribute selected, the user 702 is not happy with the item, and/or the like. In some embodiments, instead providing a field 720-2 that receives natural language input, the user interface 720 may provide a menu or other element of pre-determined options for the reasons of return.

The menu selections 720-3 are selectable by the user 702 as options for where the user 702 will drop off the asset 706 to facilitate its return. The user 702 may select, for example to drop off the asset 706 at a nearby shipping store. In some embodiments, in response to this selection, one or more Application Programming Interfaces (API) corresponding to a map (e.g., GOOGLE maps) of different carrier stores can be displayed and the user 702 can select which store that she will drop the asset 706 off at. The user 702 may alternatively select, for example, to drop off the asset 706 at a participating access point (e.g., a retailer). In some embodiments, in response to this selection, one or more APIs corresponding to a map of different access points can be displayed and the user 702 can select which access point that she will drop the asset 706 off at. The user 702 may alternatively select, for example, an option to just have the asset 706 picked up from her place (e.g., place of residence, geo-coordinates, or employer address). In response to this selection, some embodiments provide a notification to the mobile device 704 that asks whether the user 702 would like to print his or her own new shipping label so that the new shipping label (with the new return facility address) is already affixed to the asset 706 when carrier personnel pick it up. In some embodiments, each of these selections indicated in the menu 720-3 are used by embodiments to perform specific printing or changing of record functionality, as described in more detail below.

Some or each of the information inputted or selected by the user 702 within the user interface 720 may be included in an asset return request as described herein. In some embodiments, some or all of the information input to the user interface 720 (and/or authentication information) is obtained by the return label request module 506 and/or shipper device notification module 508 and transmitted to the asset return request module 403 of FIG. 4 or other component so as to facilitate the generating of a return shipping label or change an address that the asset 706 gets shipped to, as described, for example, with respect to the modules 405, 407, and 515 of FIG. 4. In some embodiments, some or all of the information input by the user 702 to the user interface 720 is obtained at registration time or is located within the user profile data store 411 such that one or more portions of the user interface 720 does not need to be provided. Rather, automatic requests can be generated without user input.

In some embodiments, some or all of the user input that is provided to the user interface 720 is used to generate a return shipping label or change the shipping address. In this way, the changing of the address or generation of the shipping label can be based at least in part on the input provided to the user interface 720 by the user 702. For example, in response to the user 702 selecting an option to return the asset 706 to "a nearby shipping store," and selecting a specific location, the return label request module 506 can receive this information and transmit an asset return request (e.g., to the logistics serer(s) 105), which gets routed to the specific location that the user 702 selected for drop off. This asset return request may act as a control signal (e.g., to the printer device(s) 123) or notification for the specific location to print the new shipping label (e.g., as described with respect to the shipping label 608 of FIG. 6). This functionality may similarly occur when the user 702 selects the "a participating access point" option. In another example, in response to the user 702 selecting an option to "just pick it up at my place," the return label request module 506 can receive this information and transmit (e.g., automatically) a control signal to a printer device (e.g., which may have an IP address or other registered information indicated in the user profile data store 411) within the user's 702 dwelling or other location. Alternatively, for example, carrier personnel devices (e.g., DIADs) may receive indications of the "just pick it up at my place" option and responsively generate and/or print a new return label such that when the asset is picked up, carrier personnel can place the already-printed new return label on the asset to facilitate its return.

IV. Exemplary System Operation

FIG. 8 is a flow diagram of an example process 800 for automatically changing a destination location for one or more assets to be delivered to for the generating of a return label, according to some embodiments. The process 800 (and/or any of the functionality described herein, such as process 900) may be performed by processing logic that comprises hardware (e.g., circuitry, dedicated logic, programmable logic, microcode, etc.), software (e.g., instructions run on a processor to perform hardware simulation), firmware, or a combination thereof. Although particular blocks described in this disclosure are referenced in a particular order at a particular quantity, it is understood that any block may occur substantially parallel with or before or after any other block. Further, more (or fewer) blocks may exist than illustrated. For example, in some embodiments, the process 800 may not include the block 808, which may be optional. Any added blocks may include blocks that embody any functionality described herein. The computer-implemented method, the system (that includes at least one computing device having at least one processor and at least one computer readable storage medium), and/or the computer program product/computer storage media as described herein may perform or be caused to perform the process 800, and/or any other functionality described herein. In some embodiments, the logistics server(s) 105 performs the process 800. Alternatively, some or all of the components of FIG. 1 performs the process 800.

Per block 802, one or more identifiers (associated with computer-readable indicia that is electronically scanned) is received. For example, at a first time, one or more identifiers are received based on an electronic scan of computer-readable indicia. The "identifiers" as described herein may be the computer-readable indicia itself, computer-readable indicia that has been decoded (e.g., natural language words or character sequences that represent the computer-readable indicia), a flag, and/or a notification that computer-readable indicia has been scanned. In another example, at a first time, an indication may be received that computer-readable indicia is electronically scanned. In like manner, the "indication" as described herein may be the computer-readable indicia itself, computer-readable indicia that has been decoded (e.g., natural language words or character sequences that represent the computer-readable indicia), a flag, and/or a notification that computer-readable indicia has been scanned. In some embodiments, the computer-readable indicia is coupled (e.g., adhesively fixed) to one or more assets. In some embodiments, the asset is associated with one or more shipping operations.

In other words, some embodiments receive at a first time, an indication that computer-readable indicia is electronically scanned by a computing device, the computer-readable indicia being coupled to an asset, wherein the asset is caused to be shipped by a shipping entity and delivered to a destination location associated with a recipient of the asset. A "shipping entity" as described herein refers to a consignor, a shipper (e.g., a retailer that sells an item to be delivered to a destination location), or a logistics company/carrier (e.g., UPS).

A "shipping operation" as described herein is any suitable operation related to shipping, such as a final mile delivery of assets (i.e., delivering assets to final destination location), delivering assets from one sorting facility to another, delivering assets from a carrier store to a sorting facility, importing or exporting assets, flying or otherwise carrying assets to/away from a sorting facility, loading an asset into a logistics vehicle, picking an asset from a logistics vehicle for drop off at another location, etc. An "asset" as described herein is any tangible item that is transported from one location to another. Assets may be or include the contents that enclose product or other items people wish to ship. For example, an asset may be or include a parcel or group of parcels, a package or group of packages, a box, a crate, a drum, a container, a box strapped to a pallet, a bag of small items, and/or the like.

In some embodiments, block 802 is performed by the asset return request module 403 of FIG. 4 and/or performs any functionality as described with respect to the return request module 403 of FIG. 4. In an illustrative example of block 802 and referring back to FIG. 6, the logistics server(s) 105 or other component may receive the identifiers or indications that the mobile device 604 has electronically scanned the computer-readable indicia 608-1. In some embodiments, the computer-readable indicia includes a matrix barcode such that a mobile device associated with the recipient scans the matrix barcode prior to the receiving of the indication. A "matrix barcode" as described herein is a two-dimensional symbology that encodes text, numbers, files, or any suitable data (e.g., cells, boxes, lines, etc.). For example, the matrix barcode may be a QR code, a data matrix, a PDF417, an Aztec code, Code 39, MAXICODE, or the like. In some embodiments, the mobile device scanning and related functionality is described with respect to FIG. 6.

In some embodiments, the computer-readable indicia includes an ID of the asset(s) it is coupled to and a site location (e.g., physical address or geo-coordinates, such as longitude and latitude) for the return of the asset(s), which may be used to perform block 806, as described in more detail below.

Per block 804, it is determined that one or more assets have been requested for return. For example, in some embodiments, based at least in part on the receiving of the indication (that computer-readable indicia is electronically scanned), it is determined that a recipient of the corresponding asset has requested a return of the asset. In another example, based at least in part on the one or more identifiers (that are received per block 802), that is determined that an asset is requested for return. For example, based on analyzing the content of the decoded computer-readable indicia (e.g., address of return facility), embodiments can determine that a user or recipient has requested a return of an asset. In some embodiments, block 804 occurs "automatically" (e.g., as a background task without an explicit user selection or input). Examples of block 804 are described with respect to the asset return request module 403 and FIGS. 6 and 7.

In some embodiments, in response to the receiving of the indication (as described with respect to block 802), a web page or app page is automatically caused to be displayed to a user device. In some embodiments, the web page or app page is indicative of authenticating and authorizing the recipient to return the asset. For example, such web page or app page may be or include the user interface 720 as described with respect to FIG. 7. In some embodiments, the web page or app page is additionally or alternatively indicative of information provided to users in order to help facilitate block 806 and/or block 808. For example, referring back to FIG. 7, the input that is provided via the menu 720-3 can be used by embodiments to facilitate the generating of a shipping label as described with respect to FIG. 7.

In some embodiments, in response to the receiving of the one or more identifiers (described at block 802), embodiments automatically authenticate and authorize a recipient for the return of an asset. For example, instead of a user having to manually enter in authentication (e.g., a password) information to the user interface 720, embodiments can automatically authorize the return of the asset (e.g., via information located in the user profile data store 411, as opposed to information still needing to be input at the user interface 720). In some embodiments, the automatic authentication and authorization is based on contents of the computer-readable indicia, such as the new site of return address, and the like.

Per block 806, based at least in part on content of the computer-readable indicia, a destination location for the asset(s) to be delivered to is automatically changed. For example, based at least in part on contents within the computer-readable indicia, a location for the asset to be delivered to is automatically changed in a structured data record stored in computer memory. A "structured data record" as described herein is any suitable structured object, such as a database row or record, field, entry, or other data store record that is stored in computer memory (e.g., RAM or non-volatile storage hard drives). Referring back to FIG. 4, for example, the return label generator 407 can change a record located in the logistics operation data store 413, as described above. The "content" of the computer-readable indicia may include the asset(s) ID, the address or other location of the facility that accepts returns, and/or any other suitable data, such as new timeline for shipping the corresponding new item. Accordingly, the "destination location" is no longer the original recipient's address or location but is the address or location that accepts the return delivery.

In some embodiments, the one or more identifiers (described at block 802) or the computer-readable indicia include an ID of the asset and a site location for the return of the asset such that the changing at block 806 includes changing a first address to a second address corresponding to the site location based reading the computer-readable indicia. Examples of this (and block 806 in general) are also describe above with respect to the shipping label 608 of FIG. 6, where an original recipient address can be changed (e.g., on the natural langue section 608-2) to a return site address that is included in the computer-readable indicia 608-1.

Per block 808, a return shipping label is generated (e.g., as described with respect to the return label generator 407). Some embodiments automatically generate a shipping label in response to the automatically changing as described with respect to block 806 and the return label generator 407. Based at least in part on the one or more identifiers (or contents of the identifiers descried at block 802), some embodiments automatically generate a shipping label corresponding to a destination location for the asset to be returned to (e.g., as described with respect to the return label generator 407). Some embodiments additionally or alternatively cause a tangible printing of the shipping label (e.g., as described by the return label 409 of FIG. 4) in response to the generating of the shipping label at block 808. For example, referring back to FIG. 1, the logistics server(s) 105 (or mobile computing entity 110) can send a control signal to the printer device(s) 123 to print a paper copy of a shipping label. In another example, the "causing" a tangible printing may alternatively not include a control signal, but a notification that a return label is ready to be printed. Accordingly, for example, in response to carrier personnel scanning the computer-readable indicia, carrier personnel can manually print out the new return label.

Some embodiments receive, at a second time subsequent to the first time (described at block 802), a second indication that the computer-readable indicia has been scanned. In some embodiments, the scanning of the computer-readable indicia at the second time is at least partially indicative of the asset being located at a shipping facility that prints labels. For example after the mobile device 604 has scanned the computer-readable indicia 608-1 as illustrated in FIG. 6, the user 602 may travel to a logistics store to drop the asset off. Subsequently, a clerk or carrier personnel located at the logistics store may use a scanner to scan the computer-readable indicia as described with respect to FIG. 4. In some embodiments, in response to the receiving of the second indication, embodiments automatically cause a printing of a shipping label (e.g., the generated shipping label at block 808) at the shipping facility or logistics store so that the shipping label can be affixed to the asset(s) to facilitate the return of the asset(s), as described for example with respect to FIG. 4. For example, after the clerk or other carrier personnel uses a scanner to scan the asset(s), embodiments automatically send a control signal to a printer in the facility or notification to the carrier personnel such that the return shipping label is printed. Subsequently, the carrier personnel can affix the new return shipping label to the returned asset for return.

In some embodiments, prior to the automatically generating of the shipping label (block 808), embodiments change a structured data record corresponding to a destination location for the asset to be shipped to based on location information (e.g., address or coordinates for the site of return) included in the one or more identifiers, as described, for example, with respect to block 806 and/or the return label generator 407.

In some embodiments, there are other operations or blocks not illustrated in the process 800 that can occur, such as a tangible printing of the generated return shipping label. For example, some embodiments cause a tangible printing of the shipping label in response to the generating of the shipping label based at least in part on sending a control signal to a printing machine (e.g., the printing device(s) 123 of FIG. 1) in a logistics facility (e.g., carrier store, logistics store, or any suitable location that facilitates delivery of assets). Some embodiments receive an indication that the computer-readable indicia is scanned at a logistics store or access point and in response to the receiving of this indication, embodiments automatically cause (e.g., via a control signal or notification as described above) a printing of a shipping label where the shipping label is to be affixed to the asset to facilitate the return of the asset.

FIG. 9 is a flow diagram of an example process 900 for generating one or more notifications that include a request to return one or more assets, according to some embodiments. In some embodiments, the process 900 is performed by the computing entity 110 of FIG. 1. Alternatively or additionally, in some embodiments, some or each of the blocks are performed by other components of FIG. 1. In some embodiments, more or fewer blocks can be included in the process 900. For example, in some embodiments, the process 900 does not include block 903 such that the notification(s) are generated in response to block 901. Any Per block 901, embodiments scan computer-readable indicia coupled to one or more assets. In some embodiments, this may include electronically scanning, by a mobile device, computer-readable indicia that is coupled to an asset where the asset is associated with one or more shipping operations. For example, the mobile device 604 can scan the computer-readable indicia 608-1 of FIG. 6. In an illustrative example of block 901, the scanning module 502 as described with respect to FIG. 5 can scan computer-readable indicia. In some embodiments, the computer-readable indicia includes a matrix barcode such that a mobile device recipient of the asset scans the matrix barcode such that in response to the mobile device scanning the matrix barcode, the receiving of the one or more identifiers occurs (e.g., as described at block 802 of FIG. 8).

Per block 903, one or more portions of a user interface to verify one or more users are generated. For example, at least partially in response to the electronically scanning at block 901, embodiments generate (e.g., automatically) one or more portions (e.g., a window, a notification, a button, a page) of a user interface. In some embodiments, the one or more portions are indicative of a prompt for a user to input verification information for a return of the asset. A "prompt" as described herein is a request, field, button, feature, element, or any suitable notification that is provided to a user device so that the user device can input information. In some embodiments, the prompt includes a request for the user to input authentication information. In an illustrative example of block 903, an interface may be generated by the verification interface module 504 as described with respect to FIG. 5, for example. In another example, the user interface 720 (or any portion thereof) can be generated as described with respect to FIG. 7.

Per block 905, particular embodiments generate one or more notifications that include a request to return the one or more assets. In some embodiments, the one or more notifications include a messages transmitted to a logistics server associated with a logistics facility to automatically print a shipping label for the asset. For example, this notification may include a notification as received or transmitted by the return label request module 506 to the asset return request module 403. In this example, this notification is transmitted to the asset return request module 403 and subsequently processed by the components 405, 407, 415 as described with respect to FIG. 4). In some embodiments, the one or more notifications include a message transmitted to a user device (or other computer, such as the third party server(s) 125) associated with a shipper of the asset and the message includes an indication that the asset is requested to be returned to the shipper. For example, this notification may include a notification as received or transmitted by the shipper device notification module 508 as described with respect to FIG. 5. In another example, the indication can be natural language text transmitted to a shipper user device that indicates that the recipient is returning one or more assets back to the shipper because of particular reasons.

In some embodiments, a mobile device or other user device associated with a recipient generates a shipping label (e.g., at least partially in response to the receiving the input of the verification information). For example, referring back to FIG. 7, in response to the user populating the fields and other features within the user interface 720, embodiments can generate a new shipping label with an address of the physical site of return (e.g., as indicated in the computer-readable indicia). In some embodiments, the mobile device or other user device cause a tangible printing of the shipping label (e.g., in response to the generating of the shipping label). For example, a user device of a recipient can send a control signal to a printing machine located in her or her home, which prints (e.g., automatically) the generated shipping label.

Definitions

"And/or" is the inclusive disjunction, also known as the logical disjunction and commonly known as the "inclusive or." For example, the phrase "A, B, and/or C," means that at least one of A or B or C is true; and "A, B, and/or C" is only false if each of A and B and C is false.

A "set of" items means there exists one or more items; there must exist at least one item, but there can also be two, three, or more items. A "subset of" items means there exists one or more items within a grouping of items that contain a common characteristic.

A "plurality of" items means there exists more than one item; there must exist at least two items, but there can also be three, four, or more items.

"Includes" and any variants (e.g., including, include, etc.) means, unless explicitly noted otherwise, "includes, but is not necessarily limited to."

A "user" or a "subscriber" includes, but is not necessarily limited to: (i) a single individual human; (ii) an artificial intelligence entity with sufficient intelligence to act in the place of a single individual human or more than one human; (iii) a business entity for which actions are being taken by a single individual human or more than one human; and/or (iv) a combination of any one or more related "users" or "subscribers" acting as a single "user" or "subscriber."

The terms "receive," "provide," "send," "input," "output," and "report" should not be taken to indicate or imply, unless otherwise explicitly specified: (i) any particular degree of directness with respect to the relationship between an object and a subject; and/or (ii) a presence or absence of a set of intermediate components, intermediate actions, and/or things interposed between an object and a subject.

The terms first (e.g., first request), second (e.g., second request), etc. are not to be construed as denoting or implying order or time sequences unless expressly indicated otherwise. Rather, they are to be construed as distinguishing two or more elements. In some embodiments, the two or more elements, although distinguishable, have the same makeup. For example, a first memory and a second memory may indeed be two separate memories but they both may be RAM devices that have the same storage capacity (e.g., 4 GB).

The term "causing" or "cause" means that one or more systems (e.g., computing devices) and/or components (e.g., processors) may in in isolation or in combination with other systems and/or components bring about or help bring about a particular result or effect. For example, the logistics server(s) 105 may "cause" a message to be displayed to a computing entity 110 (e.g., via transmitting a message to the user device) and/or the same computing entity 110 may "cause" the same message to be displayed (e.g., via a processor that executes instructions and data in a display memory of the user device). Accordingly, one or both systems may in isolation or together "cause" the effect of displaying a message.

The term "real time" includes any time frame of sufficiently short duration as to provide reasonable response time for information processing as described. Additionally, the term "real time" includes what is commonly termed "near real time," generally any time frame of sufficiently short duration as to provide reasonable response time for on-demand information processing as described (e.g., within a portion of a second or within a few seconds). These terms, while difficult to precisely define, are well understood by those skilled in the art.

The term "coupled" to refers to two or more components being attached, fixed, or otherwise connected. Any suitable component can be used to couple components together, such as one or more: screws, bolts, nuts, hook fasteners, nails, etc.

The following embodiments represent exemplary aspects of concepts contemplated herein. Any one of the following embodiments may be combined in a multiple dependent manner to depend from one or more other clauses. Further, any combination of dependent embodiments (e.g., clauses that explicitly depend from a previous clause) may be combined while staying within the scope of aspects contemplated herein. The following clauses are exemplary in nature and are not limiting:

What is claimed is:

1. A method comprising:
storing, in a data record, a destination location for an asset to be delivered to, wherein the asset includes a first shipping label attached on an outside surface of the asset that includes computer-readable indicia comprising an encoded return location;
receiving, by at least one computer processor, a first indication in response to a recipient of the asset electronically scanning the computer-readable indicia via a computing device;
responsive to receiving the first indication:
decoding, by the least one computer processor, the encoded return location; and
changing, by the at least one computer processor in the data record, the destination location to a return location corresponding to the encoded return location; and
responsive to changing the destination location to the return location, causing, by the at least one computer processor, a printing of a second shipping label corresponding to the return location as a new destination location for the asset to be delivered to.

2. The method of claim 1, wherein causing the printing of the second shipping label is based on sending a control signal to a printer.

3. The method of claim 1, wherein the second shipping label comprises the computer-readable indicia, and causing the printing of the second shipping label involves:
receiving, at a time subsequent to receiving the indication, a second indication that the computer-readable indicia has been scanned, wherein scanning of the computer-readable indicia at the time subsequent to receiving the indication is at least partially indicative of the asset being located at a shipping facility; and
responsive to receiving the second indication, causing the printing of the second shipping label at the shipping facility, wherein the second shipping label is to be affixed to the asset to facilitate the shipping facility delivering the asset to the new destination location.

4. The method of claim 1, further comprising, responsive to receiving the first indication, causing at least one of a web page or an application page to be displayed on the computing device that is indicative of at least one of authenticating or authorizing the recipient to return the asset.

5. The method of claim 4, further comprising:
receiving, by the at least one computer processor and via the web page or the application page, authorization information; and
authorizing, by the at least one computer processor and based on the authorization information, the recipient to return the asset, wherein changing the destination location to the return location is further in response to authorizing the recipient to return the asset.

6. The method of claim 4, further comprising:
receiving, by the at least one computer processor and via the web page or the application page, authentication information; and
authenticating, by the at least one computer processor and based on the authentication information, credentials for the recipient, wherein changing the destination location to the return location is further in response to authenticating the credentials for the recipient.

7. The method of claim 1, wherein the first indication comprises metadata, and the method further comprises, responsive to receiving the indication, at least one of authenticating or authorizing the recipient, based on the metadata, to return the asset.

8. A system comprising:
one or more processors; and
one or more computer storage media communicatively coupled to the one or more processors, wherein the one or more computer storage media store computer-executable instructions that, when executed by the one or more processors, causes the one or more processors to perform operations comprising:
storing a destination location for an asset to be delivered to in a data record;
receiving an identifier in response to an electronic scan of computer-readable indicia by a recipient of the asset via a computing device, wherein the computer-readable indicia are included on a first shipping label coupled to an outside surface of the asset, and the computer-readable indicia comprise an encoded return location;
based on the electronic scan, decoding the encoded return location;
responsive to decoding the encoded return location, changing, in the data record, the destination location to a return location corresponding to the encoded return location; and
responsive to changing the destination location to the return location, causing a printing of a second shipping label that includes the return location for the asset to be delivered to.

9. The system of claim 8, wherein causing the printing of the second shipping label is based on sending a control signal to a printing machine in a logistics facility.

10. The system of claim 8, wherein causing the printing of the second shipping label involves:
receiving an indication that the computer-readable indicia has been scanned at a logistics store or an access point; and
responsive to receiving the indication, automatically causing the printing of the second shipping label, wherein the second shipping label is to be affixed to the asset to facilitate delivering the asset to the return location.

11. The system of claim 8, wherein the computer-readable indicia comprise a matrix barcode, and the computing device comprises a mobile device of the recipient.

12. The system of claim 8, wherein the operations further comprise, responsive to receiving the identifier, performing at least one of automatically authenticating or automatically authorizing the recipient for a return of the asset.

13. The system of claim 12, wherein performing automatically authorizing the recipient for the return of the asset involves:
receiving, via at least one of a web page or an application page, authorization information from the recipient; and
authorizing, based on the authorization information, the recipient to return the asset, wherein automatically changing the destination location to the return location is further in response to authorizing the recipient to return the asset.

14. The system of claim 12, wherein performing automatically authenticating the recipient for the return of the asset involves:
receiving, via at least one of a web page or an application page, authentication information; and
authenticating, based on the authentication information, credentials for the recipient, wherein automatically changing the destination location to the return location is further in response to authenticating the credentials for the recipient.

15. A non-transitory computer storage medium having computer-executable instructions embodied thereon that, when executed by a mobile device, cause the mobile device to perform operations comprising:
electronically scanning computer-readable indicia that is included on a shipping label of an asset, wherein the computer-readable indicia comprise an encoded return location;
responsive to electronically scanning the computer-readable indicia, generating a request to return the asset to a return location associated with the encoded return location; and
transmitting the request to a server, wherein the server, upon receiving the request, performs operations involving:
decoding the encoded return location;
responsive to decoding the encoded return location, changing a destination location stored in a data record for shipping the asset to the return location associated with the encoded return location; and
responsive to changing the destination location to the return location, causing a printing of a second shipping label corresponding to the return location as a new destination location for shipping the asset.

16. The non-transitory computer storage medium of claim 15, wherein the operations further comprise, responsive to electronically scanning the computer-readable indicia, generating a user interface, wherein the user interface requests verification information from a user for returning the asset to the return location, the request comprises the verification information, and the server, upon receiving the request, further performs operations involving verifying, based on the verification information, that the user can return the asset.

17. The non-transitory computer storage medium of claim 15, wherein the operations further comprise, responsive to electronically scanning the computer-readable indicia, generating a user interface, wherein the user interface requests authentication information from a user, the request comprises the authentication information, and the server, upon receiving the request, further performs operations involving authenticating, based on the authentication information, credentials of the user.

18. The non-transitory computer storage medium of claim 15, wherein the request comprises metadata, and the server, upon receiving the request, further performs operations comprising at least one of authenticating or authorizing a recipient, based on the metadata, to return the asset.

19. The non-transitory computer storage medium of claim 15, wherein the server, upon receiving the request, further performs operations comprising transmitting a message to a user device associated with a shipper of the asset that comprises an indication that the asset is requested to be returned to the shipper.

20. The non-transitory computer storage medium of claim 15, wherein the operations further comprise transmitting a message to a user device associated with a shipper of the asset that comprises an indication that the asset is requested to be returned to the shipper.

* * * * *